(12) United States Patent
Sethi

(10) Patent No.: US 6,370,633 B2
(45) Date of Patent: *Apr. 9, 2002

(54) CONVERTING NON-CONTIGUOUS MEMORY INTO CONTIGUOUS MEMORY FOR A GRAPHICS PROCESSOR

(75) Inventor: Prashant Sethi, Folsom, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/247,194

(22) Filed: Feb. 9, 1999

(51) Int. Cl.$^7$ .............................................. G06F 12/00
(52) U.S. Cl. ..................................................... 711/206
(58) Field of Search ........................... 711/2, 170, 173, 711/202, 206, 207, 209, 221, 203

(56) References Cited

PUBLICATIONS

Intel 440LX AGPSet: 82443LX PCI AGP Controller (PAC) datasheet, pp. 1–108, Jan. 1998.*

Accelerated Graphics Port Interface Specification, Revision 1.0, pp. 1–8, Jul. 1996.*

* cited by examiner

*Primary Examiner*—Kevin Verbrugge
(74) *Attorney, Agent, or Firm*—Blakely, Sokoloff, Taylor & Zafman LLP

(57) ABSTRACT

A method and apparatus for managing memory used by a device driver in an operating system. The method comprises: (i) configuring a chipset to set up a mapping table for memory address translation, (ii) allocating a device memory in response to a request by the device driver, and (iii) mapping non-contiguous system memory to contiguous device memory using the mapping table.

25 Claims, 16 Drawing Sheets

| VOID ProgramChipsetGARTBase(HwDeviceExtension) |

```
//Disable AGP aperture
PACCFG &= ~PCI_TO_AGP_DISABLE;  // Leave PCI to AGP enabled
PACCFG &= ~APG_GLOBAL_ENABLE;   // Disable AGP //Disable GTLB
AGP_CONTROL &= ~GTLB_ENABLE;   //Disable GTLB //Program AGP aperture base address
APERTURE_BASE = (GARTPhysicalAddress & 0xFFFFF000);

//Enable AGP aperture
PACCFG != AGP_GLOBAL_ENABLE;   //Enable AGP

//Enable GTLB
AGP_CONTROL != GTLB_ENABLE;   //Enable GTLB
```

*FIG. 3A*

VOID    GARTFlushAndEnable  (HwDeviceExtension)

//Disable GTLB
AGP_CONTROL &= ~GTLB_ENABLE;  //Disable GTLB

//Enable GTLB
AGP_CONTROL != GTLB_ENABLE;  //Enable GTLB

*FIG. 3B*

| BOOLEAN   AGPMemoryAllocateTest  (HwDeviceExtension, numPages) |
|---|

```
PagesFound = FALSE;  // Assume the worst while ((memoryCounter < MAX_AGP_MEMORY) && (!pagesFound))
{
   pagesAvailable += AGPMappedMemory[memoryCounter].PagesAvailable;
   pagesFound = (pagesAvailable >= numPages);
   memoryCounter++;
} if (!pagesFound)
{
   memoryCounter = 0;

// Search for free memory block entry
   while ((memoryCounter < MAX_AGP_Memory) &&
   (AGPMappedMemory[memoryCounter].LinearAddress != NULL))
      memory Counter++;

// Found a free entry for managing AGP memory
   if (memoryCounter != MAX_AGP_MEMORY)
   {
      AGPMappedMemory[memoryCounter].LinearAddress
      = ExAllocatePool (NonPagedPool, PAGE_SIZE*256);
      if
      (AGPMappedMemory[memoryCounter].LinearAddress == NULL)
      {
         // OS has no more to give
         // Garbage collect and go
         AGPGarbageCollect();
         return FALSE;
      }
      else
      {
         FlushCPUCache();
         AGPMappedMemory[memoryCounter].PagesAvailable = 256;
         pagesFound = AGPMemoryAllocateTest(numPages);
      }
   }
}
return pagesFound;
```

*FIG. 3C*

PHYSICAL_ADDRESS    AGPMemoryAllocate  (HwDeviceExtension)

```
// Search for free page
pageFound = FALSE;
while ((memoryCounter < MAX_AGP_MEMORY) && !(pageFound))
{
    pageFound = (
                (AGPMappedMemory[memoryCounter].LinearAddress != NULL)
                &&
                (AGPMappedMemory[memoryCounter].PagesAvailable > 0)
                );
                memoryCounter++;
} pageFound = FALSE;
memoryCounter--;    // Compensate for last increment
pageCounter = 0;
while ((pageCounter < 256) && !(pageFound))
{
    pages = AGPMappedMemory[memoryCounter].Pages[pageCounter/32];
    pages &= (0x1 << (pageCounter % 32));
    pageFound = (pages == 0);
    pageCounter++;
} pageCounter-;       //Compensate for last increment

// Get physical address of allocated page
allocatedPagePhysicalAddress =
    MmGetPhysicalAddress(
        (AGPMappedMemory[memoryCounter].LinearAddress) +
        (pageCounter * PAGE_SIZE));

// Mark page as allocated
AGPMappedMemory[memoryCounter].Pages[pageCounter/32] |=
    (0x1 << (pageCounter % 32));

// Decrement number of pages available
AGPMappedMemory[memoryCounter].PagesAvailable--;

return allocatedPagePhysicalAddress;
```

*FIG. 3D*

| VOID    AGPMemoryFree  (HwDeviceExtension, AGPAddress) |

```
memoryCounter = MAX_AGP_MEMORY;
while ((memoryCounter > 0) && !(pageFound))
{
    memoryCounter--;
    pageCounter = 256;
    while ((pageCounter > 0) && !(pageFound))
    {
        pageCounter-;
        PageAddress = MmGetPhysicalAddress(
        (AGPMappedMemory[memoryCounter].LinearAddress)
            + (pageCounter * PAGE_SIZE));
        pageFound = (AGPAddress == PageAddress);
    }
}

// Mark page as free
AGPMappedMemory[memoryCounter].Pages[pageCounter/32]
    &= ~(0x1 << (pageCounter % 32));

// Increment number of available pages
AGPMappedMemory[memoryCounter].PagesAvailable++;

// Garbage collect and return memory to the OS if possible
AGPGarbageCollect()
```

*FIG. 3E*

| VOID    AGPGarbageCollect (HwDeviceExtension) |
|---|

```
for (memoryCounter = MIN_AGP_MEMORY;
     memoryCounter < MAX_AGP_MEMORY;
     memoryCounter++)
{
   if (AGPMappedMemory[memoryCounter].PagesAvailable == 256)
   {
      ExFreePool(AGPMappedMemory[memoryCounter].LinearAddress);
      FlushCPUCache();
      AGPMappedMemory[memoryCounter].LinearAddress = NULL;
      AGPMappedMemory[memoryCounter].PagesAvailable = 0;
   }
}
```

*FIG. 3F*

| VOID    FlushCPUCache() |

Thread = KeGetCurrentThread();

// KeSetAffinityThread must call a scheduling event for this to work
OldAffinity = KeSetAffinity(Thread, 1);
for (ProcessorNumber = 0;
     ProcessorNumber < *KeNumberProcessors;
     ProcessorNumber++)
{
   KeSetAffinityThread (Thread, NewAffinity = (0x1 << ProcessorNumber));
   KeRaiseIrql(HIGH_LEVEL, &OldIrql);
   _asm WBINVD;
   KeLoweringIrql(OldIrql);
   _asm WBINVD;
   KeLowerIrql(OldIrql);
}

KeSetAffinityThread(Thread, OldAffinity);

*FIG. 3G* include <memmgr.h>

BOOLEAN    AGPMemoryManagerInitialize(PHW_DEVICE_EXTENSION HwDeviceExtension)

// Limit AGP Aperture to 64MB
AGPApertureLength = min(AGPApertureLength, 0x4000 0000);

Program MTRRs for AGP Aperture as Write Combining;

pAGPAddressList = Null;    // No addresses are allocated yet

// Entire aperture is available for allocation
pAGPFreeBlockList -> PhysicalBaseAddress = AGPApertureBaseAddress;
pAGPFreeBlockList -> PagesAvailable = AGPApertureLength / 4096;
pAGPFreeBlockList -> NextListItem = NULL;

Allocate memory for the GART;
Zero out the GART;
Program GART Address and Enable GART;
Initialize memory manager allocation data structures;
Claim minimum memory for our own purposes;
Flush CPU Cache;

*FIG. 3H* include <memmgr.h>

VP_STATUS    AGPIoctlService(PHW_DEVICE_EXTENSION
HwDeviceExtension, PVIDEO_REQUEST_PACKET RequestPacket)

ValidateIOCTL request packet;
switch (IoControlCode)
{
    case IOCTL_VIDEO_AGP_GART_RESERVE:
        GARTLinear = GARTReserve(...);    break;
    case IOCTL_VIDEO_AGP_GART_FREE:
        GARTFree(...);    break;
    case IOCTL_VIDEO_AGP_GART_COMMIT:
        Status = GARTCommit(...);    break;
    case IOCTL_VIDEO_AGP_GART_UNCOMMIT:
        GARTUnCommit(...);    break;
    case IOCTL_VIDEO_AGP_GART_MEM_ATTRIBUTE:
        GARTMemAttributes(...);    break;
}

*FIG. 3I*

```
#include <memmgr.h>

PVOID   GARTReserve[devObj, numPages, alignMask, flags)
```

```
GARTLinear = NULL;     // Assume the worst

// Search free block list for free addresses
while ((pFreeBlockList Item != NULL)
    && (numPages > pFreeBlockListItem -> PagesAvailable))
    pFreeBlockListItem = pFreeBlockListItem -> NextItem;

if (pFreeBlockListItem != NULL)
{    // We found a free block
    // Map the free block as Write Combining
    GART Linear = MapMemory(pFreeBlockListItem -> PhysicalBaseAddress,
        memoryLength, WC);
    if (GARTLinear != NULL)
        {    //Successfully mapped into free space // Insert a new AGP memory item
            pAGPAddressListItem -> AGPLinearAddress = GARTLinear;
            pAGPAddressListItem -> PagesReserved = numPages;

// Now adjust the free block entry
            pFreeBlockListItem -> PagesAvailable -= numPages;
        }
} return GARTLinear;
```

*FIG. 3J*

```
#include <memmgr.h>

BOOLEAN GARTCommit(devObj, GARTLin, pageOffset, numPages,
flags)
```

```
// Is it in our reserved address list?
// Were enough pages reserved?
Validate parameters;
if (!(valid parameters))
    return FALSE;

// Do we have enough pages to back it up?
if (!AGPMemoryAllocateTest(HwDeviceExtension, numPages))
    return FALSE;

// Start backing up address with pages
AGPPhysicalAddress = MmGetPhysicalAddress(GARTLinear);
while (pagesAllocated < numPages)
{
    Point to the right GART Entry;
    if (!(GARTEntry & 0x01))    // if GART Entry is not enabled
    {
        // Allocate our 1 page
        allocatedPagePhysicalAddress = AGPMemoryAllocate();
        // Enable GART Entry
        GARTEntry = allocatedPagePhysicalAddress | 0x1;
        Program GART Entry;
    }
    pagesAllocated++;
}

FlushCPUCache();
GARTFlushAndEnable();

return TRUE;
```

*FIG. 3K*

```
#include <memmgr.h>

VOID  GARTUnCommit(devObj, GARTLin, pageOffset, numPages)
```

```
// Search for allocated AGP addresses
while ((pAGPAddressListItem != NULL)
    && (pAGPAddressListItem -> AGPLinearAddress != GARTLinear))
        pAGPAddressListItem = pAGPAddressListItem -> NextListItem;

// Is it in our reserved address list?
ValidateParameters;

//Do not uncommit more than reserved
if ((pageOffset+numPages) > PagesReserved)
    numPages = PagesReserved - pageOffset;

// Start uncommitting pages from address
AGPPhysicalAddress = MmGetPhysicalAddress(GARTLinear);
while (pagesFreed < numPages)
{
    Point to the right GART Entry
    if (GARTEntry)
    {
        //4K aligned physical address
        allocatedPagePhysicalAddress = GARTEntry & 0xFFFFF000;
        AGPMemoryFRee(allocatedPagePhysicalAddress);
    }
    GARTEntry = 0;    // Disable GART Entry
    pagesFreed++;
}

FlushCPUCache();
GARTFlushAndEnable();
```

*FIG. 3L*

```
#include <memmgr.h>

VOID   GARTFree(devObj, GARTLin)
```

Validate parameters;
AGPPhysicalAddress = MmGetPhysicalAddress(GARTLinear);

// UnCommit all committed memory
GARTUnCommit(GARTLinear, 0, PagesReserved);
UnmapMemory(GARTLinear);    // Unmap address space // Restore memory back to free pool
// Collapse with existing free block items if feasible
pFreeBlockListItem -> PagesAvailable = PagesReserved;
pFreeBlockListItem -> PhysicalBaseAddress = AGPPhysicalAddress;

// Remove the AGP entry
ExFreePool(pAGPAddressListItem);

*FIG. 3M*

```
#include <memmgr.h>

VOID   GARTMemAttributes(devObj, GARTLin, pFlags)
```

FIG. 3N

CONVERTING NON-CONTIGUOUS MEMORY INTO CONTIGUOUS MEMORY FOR A GRAPHICS PROCESSOR

BACKGROUND

1. Field of the Invention

This invention relates to graphics processors. In particular, the invention relates to memory manager for a graphics processor.

2. Description of Related Art

Advances in graphics design have provided many enhanced graphic performance in a general purpose computing environment. In a general purpose computing environment, an operating system (OS) provides a useful and efficient platform for the users and applications programs. One particularly important function in an OS is the management of hardware resources, especially the use of memory. Due to the complexity of memory architecture and usage in a high performance processor environment, memory management has become a central objective in modern OS design. However, a general-purpose OS cannot provide direct memory management for graphics applications programs because of the specialized nature of the graphics processor.

A modern graphics processor typically has the ability to access the system memory for graphic usage in addition to its local memory. Therefore, the problem of managing memories for a graphics processor in a general purpose computing environment has become difficult. For example, most graphic applications are memory intensive. To enhance graphic performance, graphic memory is preferably organized in a contiguous fashion. Scattered memory blocks require additional operations resulting in degraded performance. Therefore, an important feature of a memory management scheme is to convert the physically non-contiguous pages of physical system memory into contiguous memory for use by the graphics processor. In addition, other operations involving memory allocation, de-allocation, and configuration of interfacing chipset are necessary to provide a systematic and convenient facility to the device drivers for use by the applications programs.

Therefore, there is a need in the technology to provide a simple and efficient method to manage memory for a graphics processor.

SUMMARY

In one embodiment, the present invention relates to a method for managing memory used by a device driver in an operating system. The method comprises: (i) configuring a chipset to set up a mapping table for memory address translation, (ii) allocating a device memory in response to a request by the device driver, and (iii) mapping non-contiguous system memory to contiguous device memory using the mapping table.

BRIEF DESCRIPTION OF THE DRAWINGS

The features and advantages of the present invention will become apparent from the following detailed description of the present invention in which:

FIG. 3A is a pseudo code implementation of the Program_Chipset_GART_Base function according to one embodiment of the invention.

FIG. 3B is a pseudo code implementation of the GART_Flush_And_Enable function according to one embodiment of the invention.

FIG. 3C is a pseudo code implementation of the AGP_Memory_Allocate_Test function according to one embodiment of the invention.

FIG. 3D is a pseudo code implementation of the AGP_Memory_Allocate function according to one embodiment of the invention.

FIG. 3E is a pseudo code implementation of the AGP_Memory_Free function according to one embodiment of the invention.

FIG. 3F is a pseudo code implementation of the AGP_Garbage_Collect function according to one embodiment of the invention.

FIG. 3G is a pseudo code implementation of the Flush_CPU_Cache function according to one embodiment of the invention.

FIG. 3H is a pseudo code implementation of the AGP_Memory_Manager_Initialize function according to one embodiment of the invention.

FIG. 3I is a pseudo code implementation of the AGP_IOctl_Service function according to one embodiment of the invention.

FIG. 3j is a pseudo code implementation of the GART_Reserve function according to one embodiment of the invention.

FIG. 3K is a pseudo code implementation of the GART_Commit function according to one embodiment of the invention.

FIG. 3L is a pseudo code implementation of the GART_Uncommit function according to one embodiment of the invention.

FIG. 3M is a pseudo code implementation of the GART_Free function according to one embodiment of the invention.

FIG. 3N is a pseudo code implementation of the GART_Mem_Attribute function according to one embodiment of the invention.

DESCRIPTION

The present invention is a method and apparatus for managing memory in a graphic environment. A memory manager is interfaced to the operating system and the oraphics hardware to perform memory management tasks including configuration of a chipset, and allocation and de-allocation of memory in response to a memory request by a device driver. The memory manager maps non-contiguous system memory to contiguous device memory by using a mapping table in the chipset. The technique provides an efficient scheme to manage memory.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention. In the following description, the term "module" refers to a functional block that performs a specified task. A module can be implemented by hardware or software.

Figure 1:
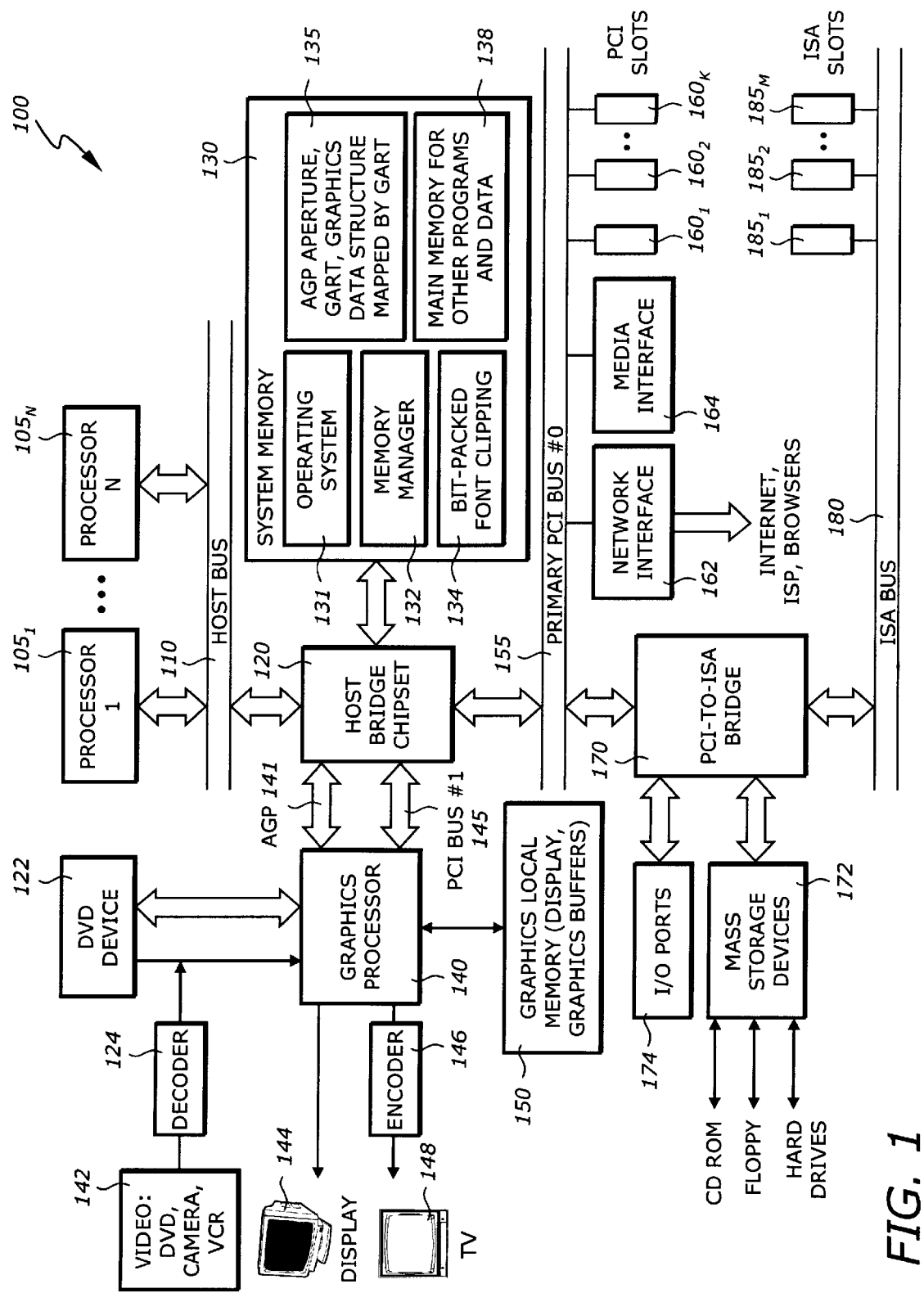
FIG. 1 is a diagram illustrating a computer system in which one embodiment of the invention can be practiced.

FIG. 1 is a diagram illustrating a computer system 100 in which one embodiment of the invention can be practiced. The computer system 100 includes N processors $105_1$ through $105_N$, a host bus 110, a host bridge chipset 120, a system memory 130, a graphics processor 140, a digital video disk (DVD) device 122, a video device 142, a decoder 124, a display monitor 144, a television (TV) 148, an encoder 146, a graphics local memory 150, a primary PCI bus #0 155, a PCI bus #1 145, an accelerated graphics port (AGP) 141, K PCI slots $160_1$ to $160_K$, a network interface 162, a media interface 164, a PCI-to-ISA bridge 170, mass storage devices 172, Input/Output (I/O) ports 174, an ISA bus 180, and ISA slots $185_1$ to $185_M$.

Each of the processors $105_1$ to $105_N$ represents a central processing unit of any type of architecture, such as complex instruction set computers (CISC), reduced instruction set computers (RISC), very long instruction word (VLIW), or hybrid architecture. The invention could be implemented in a multi-processor or single processor computer system.

The host bridge chipset 120 includes a number of interface circuits to allow the host processors $105_1$ to $105_N$ access to the system memory 130, the graphics processor 140, and the primary PCI bus #0 155. The system memory 130 represents one or more mechanisms for storing information. For example, the system memory 130 may include non-volatile or volatile memories. Examples of these memories include flash memory, read only memory (ROM), or random access memory (RAM). The system memory 130 includes an operating system (OS) 131, a memory manager 132, a bit-packed font clipping module 134, an AGP memory block 135, and other programs and data 138. Of course, the system memory 130 preferably contains additional software (not shown), which is not necessary to understanding the invention.

When implemented in software, the elements of the memory manager 132 and the bit-packed font clipping module 134 are essentially the code segments to manage memory and to enhance the hardware clipping ability of the graphics processor, respectively. The program or code segments can be stored in a processor readable medium. The "processor readable medium" may include any medium that can store or transfer information. Examples of the processor readable medium include an electronic circuit, a semiconductor memory device, a read-only memory (ROM), a flash memory, an erasable ROM (EROM), a floppy diskette, a compact disk (CD) ROM, an optical disk, a hard disk, a transmission medium, a fiber optic medium, a radio frequency (RF) link, etc. The PCI slots $160_1$ to $160_K$ provide interfaces to PCI devices. Examples of PCI devices include the network interface 162 and the media interface 164. The network interface 162 connects to communication channel such as the Internet. The Internet provides access to on-line service providers, Web browsers, and other network channels. The media interface 164 provides access to audio and video devices.

The graphics processor 140 is a high performance graphics controller that perform graphics functions such as 3D rendering operations, progressive meshes, painting, drawing, etc. The graphics processor 140 is coupled to the host bridge 120 via the AGP 141 and the PCI bus #1 145. In one embodiment, the AGP 141 is developed by Intel Corporation of Santa Clara, Calif. The graphics processor 140 has access to its own graphics local memory 150. The graphic local memory 150 may contain graphics programs and data for displaying. The DVD device 122 represents any digital video device or instrument. The video device 142 provides video input such as DVD, camera, or video cassette recorder (VCR) to the graphics processor 140. The decoder 124 decodes the video signals from the video device 142 to the graphics processor 140. The display monitor 144 displays the graphics as generated by the graphics processor 140. The encoder 146 receives the graphics data from the graphics controller 140 and encodes into an analog signal to be compatible for TV display on the TV set 148.

The PCI-to-ISA bridge provides access to the ISA bus 180, mass storage devices 172, and I/O ports 174. The mass storage devices 172 include CD ROM, floppy diskettes, and hard drives. The ISA bus 180 has a number of ISA slots 1851 to 185M to interface to ISA devices. Examples of ISA devices include data entry devices (e.g., keyboard, mouse), printers, etc.

Figure 2:
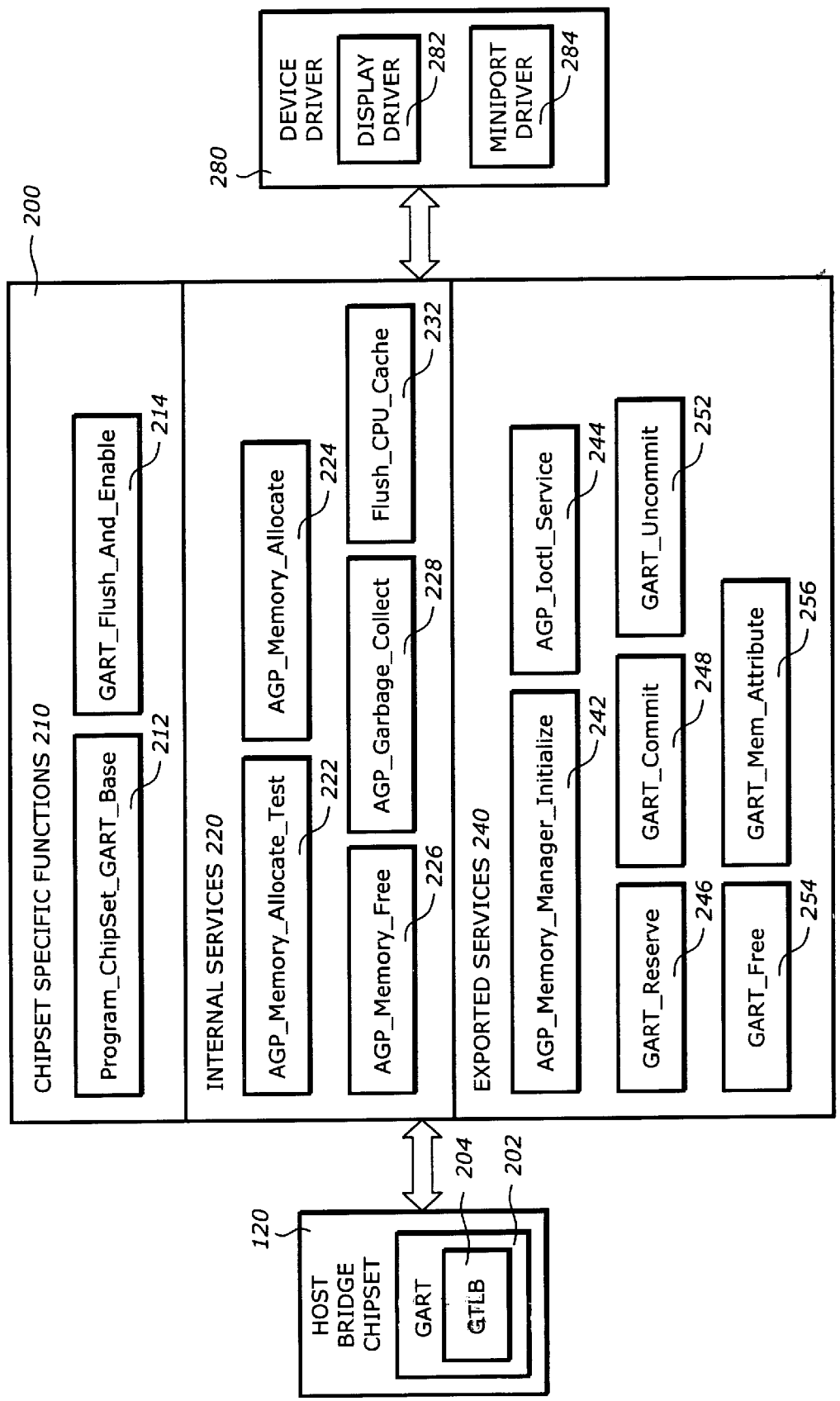
FIG. 2 is a diagram illustrating the architecture of the memory manager according to one embodiment of the invention.

FIG. 2 is a diagram illustrating the memory manager 132 according to one embodiment of the present invention. The memory manager 132 interfaces to the chipset 120 and the device driver 280.

The host bridge chipset 120 has a graphics address re-mapping table (GART) 202. The GART 202 gives AGP devices a contiguous view of the AGP memory. The AGP aperture addresses are mapped into the system memory in 4KB pages via the GART 202. The GART 202 has a graphics translation lookaside buffer (GTLB) 204. The GTLB 204 is a cache for the translation table entries located in the GART 202. The GTLB 204 is disabled and flushed whenever the GART is updated.

The device driver 280 includes a display driver 282 and a miniport driver 284. The display driver 282 includes program code to interface to display devices. The miniport driver 284 includes program code for interfacing to the miniport.

The memory manager 132 includes three modules: a chipset specific functions module 210, an internal services module 220, and an export services module 240. The memory manager 132 can be stored on a computer readable medium such as CDROM, floppy diskettes, hard disk, optical disks, etc. The computer readable medium stores program code to perform the functions in the chipset specific functions module 210, the internal services module 220, and the export services module 240 as described below.

The chipset specific functions module 210 provides functions to configure and program the chipset. The chipset specific functions module 210 includes two functions: a Program_Chipset_GART_Base 212 and a GART_flush_and_enable 214. The Program_Chipset_GART_Base 212 programs the chipset GART table address. The GART_flush_and_enable 214 reloads the chipset GART table.

The internal services module 220 provides internal functions to the memory manager 200. These internal functions are not accessible from the device driver 280 and are mainly used internally by the memory manager 200 to implement external or other internal functions. The internal services module 220 includes at least five functions: an AGP_Memory_Allocate_Test 222, an AGP_Memory_Allocate 224, an AGP_Memory_Free 226, an AGP_Garbage_Collect 228, and a Flush_CPU_Cache 232. The AGP_Memory_Allocate_Test 222 validates that enough free pages are available to satisfy an AGP memory commit request of a given size. If enough pages are not available, an attempt is made to grow the pool of available pages and satisfy the request. The AGP_Memory_Allocate 224 allocates a single page from the AGP memory pool. Usually, the AGP_Memory_Allocate_Test 222 is called before the AGP_Memory_Allocate 224 is called. The AGP_Memory_Free 226 frees a single page which has been committed to the AGP memory. The AGP_Garbage_Collect 228 returns memory from the AGP pool to the operating system if possible. The Flush_CPU_Cache 232 flushes the processor cache on all processors in a multiprocessor safe environment.

The export services module 240 provides the interface to the device driver 280. The device driver 280 can call functions in this module by supplying the appropriate device object. The export services module 240 includes an AGP_Memory_Manager_Initialize 242, an AGP_Ioctl_Service 244, a GART_Reserve 246, a GART_Commit 248, a GART_Uncommit 252, a GART_Free 254, and a GART_Mem_Attribute 256. The AGP_Memory_Manager_Initialize 242 initializes the memory manager. Usually, the graphics adapter detection code has been detected and the chipset has been enumerated before this function is called. The AGP_Ioctl_Service 244 provides an input/output control level interface to the memory manager services. The GART_Reserve 246 reserves a specified number of pages of the device memory. The GART_Commit 248 allocates system memory and commits it to the previously reserved device memory. The GART_Uncommit 252 frees the system memory and uncommits device memory. The GART_Free 254 frees the number of pages of device memory reserved with the GART_Reserve 246. The GART_Mem_Attribute 256 returns the attributes of a specified block of memory.

FIG. 3A is a pseudo code implementation of the Program_Chipset_GART_Base 212 function according to one embodiment of the invention. The parameters of the Program_Chipset_GART_Base 212 include a HwDeviceExtension parameter. The HwDeviceExtension parameter specifies the device extension used by the device driver. The Program_Chipset_GART_Base 212 has no return value.

The Program_Chipset_GART_Base 212 performs the following operations: programming the PAC configuration register (PACCFG) to leave the PCI Agent to Aperture Access enabled and to disable the aperture global access, disabling the GTLB, enabling the AGP aperture, and enabling the GTLB.

FIG. 3B is a pseudo code implementation of the GART_Flush_And_Enable function according to one embodiment of the invention. The parameters of the GART_Flush_And_Enable 214 include a HwDeviceExtension parameter. The HwDeviceExtension parameter specifies the device extension used by the device driver. The GART_Flush_And_Enable 214 has no return value.

The GART_Flush_And_Enable 214 performs the following operations: programming the PAC configuration register (PACCFG) to leave the PCI Agent to Aperture Access enabled and to disable the aperture global access, disabling the GTLB, enabling the AGP aperture, and enabling the GTLB.

FIG. 3C is a pseudo code implementation of the AGP_Memory_Allocate_Test 222 function according to one embodiment of the invention. The parameters of the AGP_Memory_Allocate_Test 222 include a HwDeviceExtension parameter and a numPages parameter. The HwDeviceExtension parameter specifies the device extension used by the device driver. The numPages parameter specifies the number of pages requested to be available for commit. The AGP_Memory_Allocate_Test 222 returns TRUE for success. The AGP_Memory_Allocate_Test 222 is normally called before the AGP_Memory_Allocate 224 is called. The AGP_Memory_Allocate_Test 222 is one service that can grow the memory pool available for AGP allocation.

The AGP_Memory_Allocate_Test 222 performs the following operations: searching for a free memory block entry, mapping the address if a free entry is found, and garbage collecting if there is no more free entry from the operating system.

FIG. 3D is a pseudo code implementation of the AGP_Memory_Allocate 224 function according to one embodiment of the invention. The parameters of the AGP_Memory_Allocate 224 include a HwDeviceExtension parameter. The HwDeviceExtension parameter specifies the device extension used by the device driver. The AGP_Memory_Allocate 224 returns the physical address for the allocated page. The AGP_Memory_Allocate_Test 222 is normally called before the AGP_Memory_Allocate 224 is called.

The AGP_Memory_Allocate 224 performs the following operations: searching for a free page, updating the memory counter and page counter, obtaining the physical address of the allocated page, marking the selected page as allocated, and updating the number of pages available.

FIG. 3E is a pseudo code implementation of the AGP_Memory_Free 226 function according to one embodiment of the invention. The parameters of the AGP_Memory_Free 226 include a HwDeviceExtension parameter and a AGPAddress parameter. The HwDeviceExtension parameter specifies the device extension used by the device driver. The AGPAddress parameter specifies the physical address of the page to be freed. The AGP_Memory_Free 226 has no return value. The AGP_Memory_Free 226 frees a page that has been previously allocated by the AGP_Memory_Allocate 224. The AGP_Memory_Free 226 may also shrink the size of the AGP memory pool by returning memory to the operating system.

The AGP_Memory_Free 226 performs the following operations: updating memory counter and page counter, marking a freed page as free, updating the number of available pages, and garbage collecting and returning memory to the operating system if possible.

FIG. 3F is a pseudo code implementation of the AGP_Garbage_Collect 228 function according to one embodiment of the invention. The parameters of the AGP_Garbage_Collect 228 include a HwDeviceExtension parameter. The HwDeviceExtension parameter specifies the device extension used by the device driver. The AGP_Garbage_Collect 228 has no return value. The AGP_Garbage_Collect 228 shrinks the size of the AGP memory pool by returning memory to the operating system. A minimum pool of the AGP memory is always maintained.

The AGP_Garbage_Collect 228 performs the following operations: updating memory counter, freeing a memory, flushing the cache, and initializing the linear addresses and the number of available pages.

FIG. 3G is a pseudo code implementation of the Flush_CPU_Cache 232 function according to one embodiment of the invention. The Flush_CPU_Cache 232 has no parameters and no return value. The Flush_CPU_Cache 232 flushes the cache on all processors using a thread that has affinity for all processors.

The Flush_CPU_Cache 232 performs the following operations: obtaining the current thread, scheduling events, and activating a flush control mechanism.

FIG. 3H is a pseudo code implementation of the AGP_Memory_Manager_Initialize 242 function according to one embodiment of the invention. The parameters of the AGP_Memory_Manager_Initialize 242 include a HwDeviceExtension parameter. The HwDeviceExtension parameter specifies the device extension used by the device driver. The AGP_Memory_Manager_Initialize 242 returns TRUE for success. The AGP_Memory_Manager_Initialize 242 initializes the memory manager and is called at the time of initialization of the graphics adapter.

The AGP_Memory_Manager_Initialize 242 performs the following operations: limiting the AGP aperture to a predefined size, programming the MTTRs for AGP aperture as write combining, marking the entire aperture to be available for allocation, allocating memory for the GART, zeroing out the GART, programming the GART address, enabling the GART, initializing data structures of the memory manager, claiming minimum memory as a default size, and flushing the processor cache.

FIG. 3I is a pseudo code implementation of the AGP_IOctl_Service 244 function according to one embodiment of the invention. The parameters of the AGP_IOctl_Service 244 include a HwDeviceExtension parameter and a RequestPacket parameter. The HwDeviceExtension parameter specifies the device extension used by the device driver. The RequestPacket parameter specifies the IOCTL request packet as received by the miniport. The AGP_IOctl_Service 244 returns the status as returned by the video miniport IOCTL service routine. The AGP_IOctl_Service 244 is called by the video miniport in response to an AGP memory manager request made by the device driver upon receiving one of the AGP IOCTL messages. The miniport driver normally returns the status value received from the AGP_IOctl_Service 244 in the request packet status block.

The AGP_IOctl_Service 244 performs the following operations: validating the IOCTL request packet, and calling appropriate functions (e.g., GART_Reserve 246, GART_Free 254, GART_Commit 248, GART_Uncommit 252, GART_Mem_Attribute 256) according to the IOControlCode.

FIG. 3j is a pseudo code implementation of the GART_Reserve 246 function according to one embodiment of the invention. The parameters of the GART_Reserve 246 include a HwDeviceExtension parameter, a numpages parameter, an alignMask parameter, and a flags parameter. The HwDeviceExtension parameter specifies the device extension used by the device driver. The numpages parameter specifies the number of pages. The alignMask parameter specifies an alignment mask for the acceptable starting pages for the GART device address. The alignMask parameter value can be used to specify the address in multiples of 4K, 8K, 16K, 32K, 64K, or 128K. The flags parameter specifies whether the pages are to be mapped as uncache memory or write combining memory. The GART_Reserve 246 returns NULL if the operation failed or a valid linear address if the operation succeeded. The GART_Reserve 246 does not allocate system memory. Therefore, the device and linear addresses cannot be used until the system memory is committed using the GART_Commit 248.

The GART_Reserve 246 performs the following operations: searching the free block list for free addresses, mapping the free block as write combining or uncached depending on the flags parameter, inserting a new AGP memory item and adjusting the free block entry of the mapping is successful, and returning the linear address.

FIG. 3K is a pseudo code implementation of the GART_Commit 248 function according to one embodiment of the invention. The parameters of the GART_Commit 248 include a HwDeviceExtension parameter, a GARTLin parameter, a pageOffset parameter, a numPages parameter, and a flags parameter. The HwDeviceExtension parameter specifies the device extension used by the device driver. The GARTLin specifies the result of a GART_Reserve 246 call. The pageOffset parameter specifies the offset in pages from the start of the reserved region. The numPages parameter specifies the number of pages. The flags parameter specifies whether the system memory committed to the device address is zero-initialized. The GART_Commit 248 returns a Boolean value indicating whether the service was successful. The offset added to the number of pages is less than or equal to the number of pages specified when the memory was reserved. It is acceptable to commit the already committed memory.

The GART_Reserve 246 performs the following operations: validating the parameters, determining if there are enough pages, backing up address with pages, updating the number of allocated pages, flushing the processor cache, and flushing and enabling GART.

FIG. 3L is a pseudo code implementation of the GART_Uncommit 252 function according to one embodiment of the invention. The parameters of the GART_Uncommit 252 include a HwDeviceExtension parameter, a GARTLin parameter, a pageOffset parameter, and a numPages parameter. The HwDeviceExtension parameter specifies the device extension used by the device driver. The GARTLin specifies the result of a GART_Reserve 246 call. The pageOffset parameter specifies the offset in pages from the start of the reserved region. The numPages parameter specifies the number of pages. The GART_Uncommit 252 does not return a value. The offset added to the number of pages is less than or equal to the number of pages specified when the memory was reserved. It is acceptable to uncommit memory that was never committed.

The GART_Uncommit 252 performs the following operations: searching for allocated AGP addresses, validating parameters, limiting the number of uncommitted pages to the number of reserved pages, uncommitting pages from addresses, flushing the processor cache, and flushing and enabling GART.

FIG. 3M is a pseudo code implementation of the GART_Free 254 function according to one embodiment of the invention. The parameters of the GART_Free 254 include a HwDeviceExtension parameter and a GARTLin parameter. The HwDeviceExtension parameter specifies the device extension used by the device driver. The GARTLin specifies the result of a GART_Reserve 246 call. The GART_Free 254 does not return a value. The GART_Free 254 also frees any system memory that was committed in addition to freeing the committed device memory.

The GART_Free 254 performs the following operations: validating parameters, obtaining the AGP physical address, uncommitting all committed memories, unmapping the address space, restoring memory back to the free pool, collapsing the freed items with existing free block items if feasible, and removing the AGP entry.

FIG. 3N is a pseudo code implementation of the GART_Mem_Attribute 256 function according to one embodiment of the invention. The parameters of the GART_Mem_Attribute 256 include a HwDeviceExtension parameter, a GARTLin parameter, and a pFlags parameter. The HwDeviceExtension parameter specifies the device extension used by the device driver. The GARTLin specifies the result of a GART_Reserve 246 call. The pFlags parameter points to where the function stores the allocation flags. The pFlags parameter may be NULL. The GART_Mem_Attribute 256 returns the device address associated with the specified linear address. The GART_Mem_Attribute 256 is not used if the device memory is write combining.

The GART_Mem_Attribute 256 performs the following operations: validating parameters and obtaining the device address.

Therefore, the present invention is a technique to manage memory efficiently for the device driver. The non-contiguous system memory is remapped to contiguous device memory. The translation table in the chipset provides the mapping.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:

configuring a chipset having a device memory to set up a mapping table for memory address translation;

allocating the device memory in response to a request by a device driver; and interfacing to the device driver via an export services module to map non-contiguous system memory to contiguous device memory using the mapping table.

2. The method of claim I wherein the configuring of the chipset comprises:

programming the mapping table; and reloading the mapping table.

3. The method of claim 1 wherein the allocating of the device memory comprises:

determining if memory pages are available to satisfy the request;

allocating a memory page from the device memory to the device driver;

freeing a memory page committed to the device memory; and returning memory from the device memory to the operating system.

4. The method of claim 1 wherein the mapping of the non-contiguous system memory comprises:

initializing management parameters;

validating control request from the device driver;

reserving memory pages in the device memory; and committing system memory to the reserved memory pages.

5. The method of claim 4 further comprising:

uncommitting committed system memory when committed system memory is not used; and freeing reserved memory pages when the reserved memory pages are not used.

6. The method of claim 4 wherein the initializing of the management parameters comprises:

limiting a graphic port aperture to a predefined aperture size;

allocating memory for the mapping table; and enabling the mapping table.

7. The method of claim 4 wherein the reserving of memory pages comprises:

locating a free block in the device memory in a free block list and a page list;

mapping the free block to the system memory using the mapping table; and updating the free block list and the page list.

8. The method of claim 4 wherein the committing of the system memory comprises:

determining if the reserved memory pages are sufficient;

allocating system memory to correspond to the reserved memory pages; and updating an allocation list.

9. The method of claim 5 wherein the uncommitting of the committed system memory comprises:

obtaining an entry to the mapping table corresponding to the committed system memory;

disabling the entry; and updating a free page list.

10. The method of claim 5 wherein the freeing of the reserved memory pages comprises:

merging the reserved memory pages with existing free block items; and removing an reserved entry.

11. A computer program product comprising:

a computer usable medium having computer program code embodied therein, the computer program product having:

(a) computer readable program code to configure a chipset having a device memory to set up a mapping table for memory address translation;

(b) computer readable program code to allocate the device memory in response to a request by a device driver; and (c) computer readable program code to interface to the device driver via an export services module to map non-contiguous system memory to contiguous device memory using the mapping table.

12. The computer program product of claim 11 wherein (a) comprises:

(a1) computer readable program code to program the mapping table; and (a2) computer readable program code to reload the mapping table.

13. The computer program product of claim 11 wherein (b) comprises:

(b1) computer readable program code to determine if memory pages are available to satisfy the request;

(b2) computer readable program code to allocate a memory page from the device memory to the device driver;

(b3) computer readable program code to free a memory page committed to the device memory; and (b4) computer readable program code to return memory from the device memory to the operating system.

14. The computer program product of claim 11 wherein (c) comprises:

(c1) computer readable program code to initialize management parameters;

(c2) computer readable program code to validate control request from the device driver;

(c3) computer readable program code to reserve memory pages in the device memory; and (c4) computer readable program code to commit system memory to the reserved memory pages.

15. The computer program product of claim 14 further comprising:

(c5) computer readable program code to uncommit committed system memory when committed system memory is not used; and (c6) computer readable program code to free reserved memory pages when the reserved memory pages are not used.

16. The computer program product of claim 14 wherein (c1) comprises:
   (c11) computer readable program code to limit a graphic port aperture to a predefined aperture size;
   (c12) computer readable program code to allocate memory for the mapping table; and
   (c13) computer readable program code to enable the mapping table.

17. The computer program product of claim 14 wherein (c3) comprises:
   (c31) computer readable program code to locate a free block in the device memory in a free block list and a page list;
   (c32) computer readable program code to map the free block to the system memory using the mapping table; and
   (c33) computer readable program code to update the free block list and the page list.

18. The computer program product of claim 14 wherein (c4) comprises:
   (c41) computer readable program code to determine if the reserved memory pages are sufficient;
   (c42) computer readable program code to allocate system memory to correspond to the reserved memory pages; and
   (c43) computer readable program code to update an allocation list.

19. The computer program product of claim 15 wherein (c5) comprises:
   (c51) computer readable program code to obtain an entry to the mapping table corresponding to the committed system memory;
   (c52) computer readable program code to disable the entry; and
   (c53) computer readable program code to update a free page list.

20. The computer program product of claim 15 wherein (c6) comprises:
   (c61) computer readable program code to merge the reserved memory pages with existing free block items; and
   (c62) computer readable program code to remove an reserved entry.

21. A system comprising:
   a chipset having a device memory and a mapping table for memory address translation; and
   a memory manager coupled to the chipset comprising:
      a chipset specific functions module to configure the chipset to set up the mapping table,
      an internal services module to allocate the device memory in response to a request by a device driver, and
      an exported services module to interface to the device driver to map non-contiguous system memory to contiguous device memory using the mapping table.

22. The system of claim 21 wherein the chipset specific functions module comprises:
   a program chipset function to program the mapping table; and
   a flush and enable function to reload the mapping table.

23. The system of claim 21 wherein the internal services module comprises:
   a test function to determine if memory pages are available to satisfy the request;
   an allocate function to allocate a memory page from the device memory to the device driver;
   a memory free function to free a memory page committed to the device memory; and
   a garbage collector to return memory from the device memory to the operating system.

24. The system of claim 21 wherein the exported services module comprises:
   an initializing function to initialize management parameters;
   a control function to validate control request from the device driver;
   a reservation function to reserve memory pages in the device memory; and
   a commit function to commit system memory to the reserved memory pages.

25. The system of claim 24 further comprising:
   an uncommit function to uncommit committed system memory when committed system memory is not used; and
   a free function to free reserved memory pages when the reserved memory pages are not used.

\* \* \* \* \*

UNITED STATES PATENT AND TRADEMARK OFFICE
CERTIFICATE OF CORRECTION

PATENT NO.    : 6,370,633 B2
DATED         : April 9, 2002
INVENTOR(S)   : Sethi It is certified that error appears in the above-identified patent and that said Letters Patent is hereby corrected as shown below:

Column 2,
Line 50, delete "oraphics", insert -- graphics --.

Signed and Sealed this

Twenty-eighth Day of January, 2003

JAMES E. ROGAN
*Director of the United States Patent and Trademark Office*